United States Patent
Power, II et al.

(10) Patent No.: US 11,850,452 B2
(45) Date of Patent: Dec. 26, 2023

(54) HARNESS WITH CONTINUOUS LINEMANS LOOP

(71) Applicant: Tethrd LLC, Carver, MN (US)

(72) Inventors: Walter Ernest Power, II, Jordan, MN (US); Gregory Alan Godfrey, Richmond Hill, GA (US); Carl Eugene Kossuth, III, Jordan, MN (US)

( * ) Notice: Subject to any disclaimer, the term of this patent is extended or adjusted under 35 U.S.C. 154(b) by 0 days.

(21) Appl. No.: 17/167,752

(22) Filed: Feb. 4, 2021

(65) Prior Publication Data

US 2021/0178200 A1    Jun. 17, 2021

Related U.S. Application Data

(63) Continuation of application No. 16/717,618, filed on Dec. 17, 2019, now abandoned.

(51) Int. Cl.
*A62B 35/00* (2006.01)
*A63B 27/00* (2006.01)

(52) U.S. Cl.
CPC .......... *A62B 35/0012* (2013.01); *A63B 27/00* (2013.01)

(58) Field of Classification Search
CPC ..... A62B 35/0012; A63B 27/00; A01M 31/02
USPC .......................................................... 182/9
See application file for complete search history.

(56) References Cited

U.S. PATENT DOCUMENTS

| | | | | |
|---|---|---|---|---|
| 296,769 | A * | 4/1884 | Miller | A62B 1/06 182/7 |
| 1,903,081 | A * | 3/1933 | Wotherspoon | A41F 9/002 224/223 |
| 1,980,678 | A * | 11/1934 | Gordon | A62B 35/0031 24/643 |
| 2,317,346 | A * | 4/1943 | Reith | A62B 35/0006 182/4 |
| 2,834,525 | A * | 5/1958 | Shawgo | A62B 35/0031 182/9 |
| 3,757,893 | A * | 9/1973 | Hobbs | A62B 35/0025 182/6 |
| 3,840,091 | A * | 10/1974 | Conlon | A62B 35/0068 182/9 |
| 4,101,165 | A | 7/1978 | Hammer | |
| 4,103,758 | A * | 8/1978 | Himmelrich | A62B 35/0012 182/3 |
| 4,298,091 | A * | 11/1981 | Anderson | A62B 35/0068 182/3 |

(Continued)

FOREIGN PATENT DOCUMENTS

WO    WO2018111624    6/2018

*Primary Examiner* — Daniel P Cahn
*Assistant Examiner* — John W Hanes, Jr.

(57) ABSTRACT

A harness with continuous lineman's loop includes a saddle having an upper strap and a lower strap. The saddle has a front side, a back side, a first lateral edge and a second lateral edge wherein the first and second lateral edges are used to engage a bridge line such that the bridge line can be secured to a tree. A pair of lineman's loops is attached to the saddle and used to engage a lineman's rope. Each of the lineman's loops is positioned adjacent to one of the first and second lateral edges. The lineman's loops are comprised of a continuous loop of webbing including an upper portion is attached to the upper strap and a lower portion is attached to the lower strap. The lineman's loops are formed of lateral portions of the continuous loop extending between the upper and lower portions.

6 Claims, 6 Drawing Sheets

(56) References Cited

U.S. PATENT DOCUMENTS

| | | | |
|---|---|---|---|
| 4,579,196 A * | 4/1986 | Allen | A62B 35/0068 182/9 |
| 4,595,078 A * | 6/1986 | Greenway | A63B 27/00 182/133 |
| 4,687,074 A * | 8/1987 | Green | A45F 3/26 182/3 |
| 5,010,850 A * | 4/1991 | Sailer | A01K 27/00 182/3 |
| 5,050,704 A * | 9/1991 | Olsson | A62B 35/0018 182/9 |
| 5,069,153 A * | 12/1991 | Pascher | B63H 8/54 114/39.18 |
| 5,222,991 A * | 6/1993 | Bell | A62B 35/0068 182/133 |
| 5,234,074 A * | 8/1993 | Bell | A63B 27/00 182/133 |
| 5,257,419 A * | 11/1993 | Alexander | A61F 5/028 2/338 |
| 6,035,966 A | 3/2000 | Lewis | |
| 6,223,854 B1 * | 5/2001 | Nolz | A41D 13/0007 182/133 |
| 6,450,129 B1 * | 9/2002 | Flynn | A01K 27/00 119/770 |
| 6,944,381 B2 | 9/2005 | Kurusu | |
| 7,051,836 B2 * | 5/2006 | Green | A01M 31/02 182/187 |
| 7,063,185 B2 * | 6/2006 | Green | A01M 31/02 182/187 |
| D559,467 S * | 1/2008 | Petzl | D29/101.1 |
| 7,979,919 B2 * | 7/2011 | Joran | A62B 35/0018 2/69 |
| 8,061,479 B2 | 11/2011 | Harris, Jr. | |
| 8,292,028 B2 | 10/2012 | Wise | |
| 8,333,262 B1 * | 12/2012 | Carpenter | A62B 35/0012 182/6 |
| 8,356,691 B2 | 1/2013 | Griffith | |
| 8,584,799 B1 | 11/2013 | Dennington | |
| 9,162,091 B2 * | 10/2015 | Kuhnert | A62B 35/0012 |
| 9,168,401 B2 * | 10/2015 | Botti | A62B 35/0012 |
| 9,320,925 B2 | 4/2016 | Wise | |
| 9,808,659 B2 | 11/2017 | Chevalier | |
| 10,258,814 B2 | 4/2019 | Casebolt | |
| 10,864,975 B2 * | 12/2020 | Gerhart | B63H 8/58 |
| 10,946,248 B1 * | 3/2021 | Rullo | A44B 13/0029 |
| 2003/0176122 A1 * | 9/2003 | Schwindt | A62B 35/0031 441/80 |
| 2008/0179136 A1 | 7/2008 | Griffith | |
| 2009/0255756 A1 | 10/2009 | Green | |
| 2011/0302685 A1 * | 12/2011 | Fay, III | A62B 35/0006 2/69 |
| 2012/0217090 A1 | 8/2012 | Green | |
| 2015/0114753 A1 * | 4/2015 | Rullo | A62B 35/0006 182/9 |
| 2015/0231422 A1 * | 8/2015 | Perner | A62B 35/0012 182/3 |
| 2020/0324153 A1 * | 10/2020 | Power, II | A01M 31/02 |

* cited by examiner

HARNESS WITH CONTINUOUS LINEMANS LOOP

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to harness device and more particularly pertains to a new harness device for supporting a person while climbing and positioning oneself in a tree to prevent their falling from the tree. More particularly, the disclosure includes a modified lineman's rope connection which utilizes a continuous loop attached to a saddle for the purpose of strengthening the connection with the lineman's rope as well as distributing the user's weight across a greater area to increase use comfort.

(2) Description of Related Art Including Information Disclosed Under 37 CFR 1.97 and 1.98

The prior art relates to harness devices which typically include a lineman's loop for engaging a lineman's rope wherein the lineman's loop is typically a pair loops attached to the edge of a harness. Thus, when a lineman's rope is attached to the lineman's loop, the loops concentrate the force on the edges of the harness to reduce comfort and safety when the user is being supported by the harness.

BRIEF SUMMARY OF THE INVENTION

An embodiment of the disclosure meets the needs presented above by generally comprising a saddle configured to receive the buttocks of a person. The saddle has an upper strap and a lower strap. The saddle has a front side, a back side, a first lateral edge and a second lateral edge wherein the first and second lateral edges are used to engage a bridge line such that the bridge line can be secured to a tree. A pair of lineman's loops is attached to the saddle and used to engage a lineman's rope. Each of the lineman's loops is positioned adjacent to one of the first and second lateral edges. The lineman's loops are comprised of a continuous loop of webbing including an upper portion is attached to the upper strap and a lower portion is attached to the lower strap. The lineman's loops are formed of lateral portions of the continuous loop extending between the upper and lower portions.

Thus, as can be appreciated from the above, the continuous loop is positioned along the upper and lower straps of the saddle assembly to distribute the weight of a user across the continuous loop and across the upper and lower straps. This distribution of weight and pressure across the entire length of the upper and lower straps enhances strength, safety and comfort for the user.

In another embodiment, the disclosure provides for a saddle configured to receive the buttocks of a person. The saddle includes a closed loop that is formed by a continuous strap. The saddle has a front side, a back side, a first lateral edge and a second lateral edge wherein the first and second lateral edges are used to engage a bridge line such that the bridge line can be secured to a tree. A pair of lineman's loops is attached to the saddle and used to engage a lineman's rope. Each of the lineman's loops is positioned adjacent to one of the first and second lateral edges. The lineman's loops are comprised of a continuous loop of webbing including an upper portion attached to the upper strap and a lower portion attached to the lower strap. The lineman's loops are formed of lateral portions of the continuous loop extending between the upper and lower portions. A flat or contoured panel of flexible material is attached to the upper and lower straps and extends from the first lateral strap to the second lateral. This panel may be comprised of a flexible material such as a mesh or fabric material. The panel may further be resiliently stretchable or inelastic in nature.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
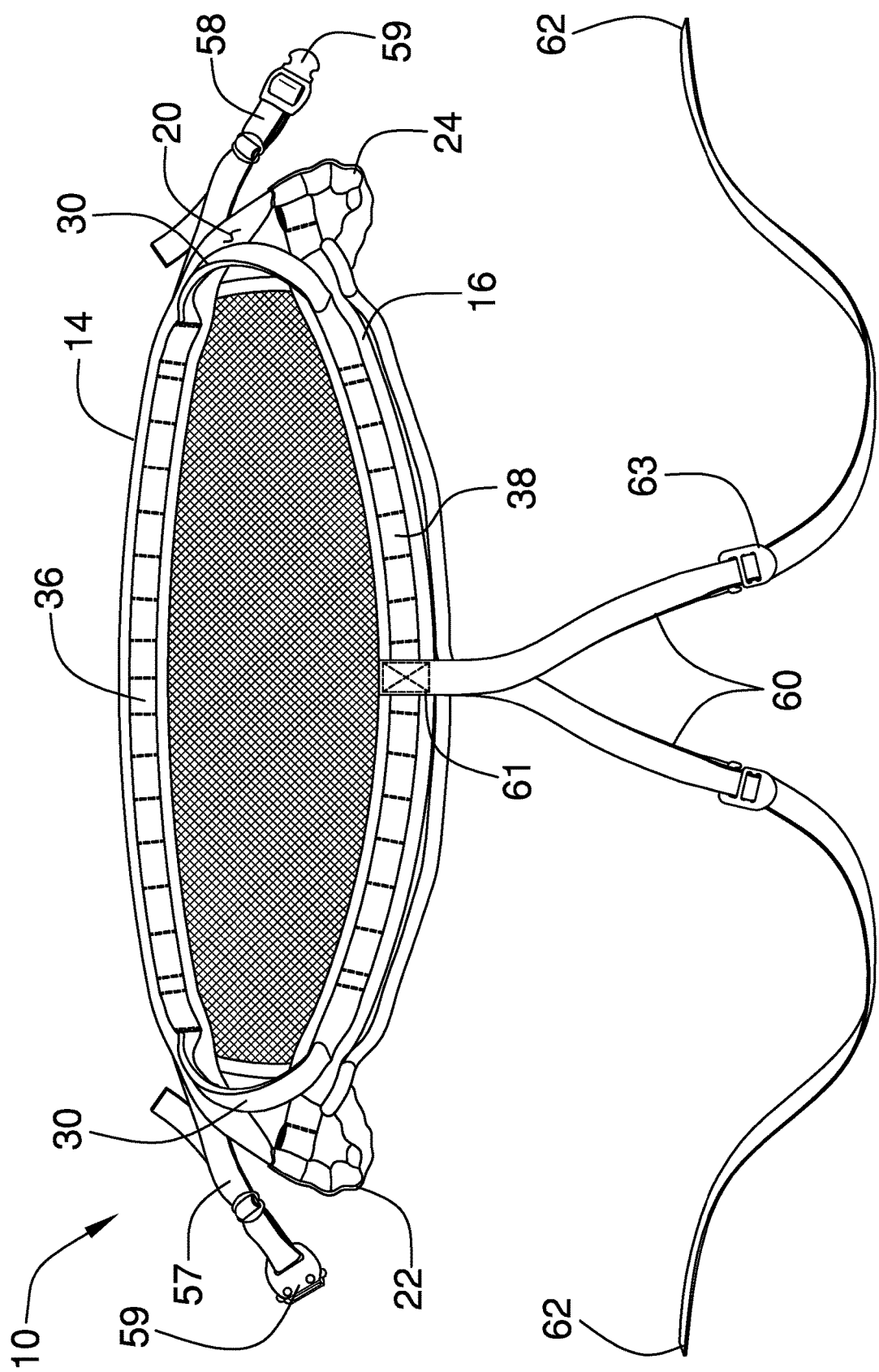
FIG. 1 is a rear view of a harness with continuous lineman's loop according to an embodiment of the disclosure.
Figure 2:
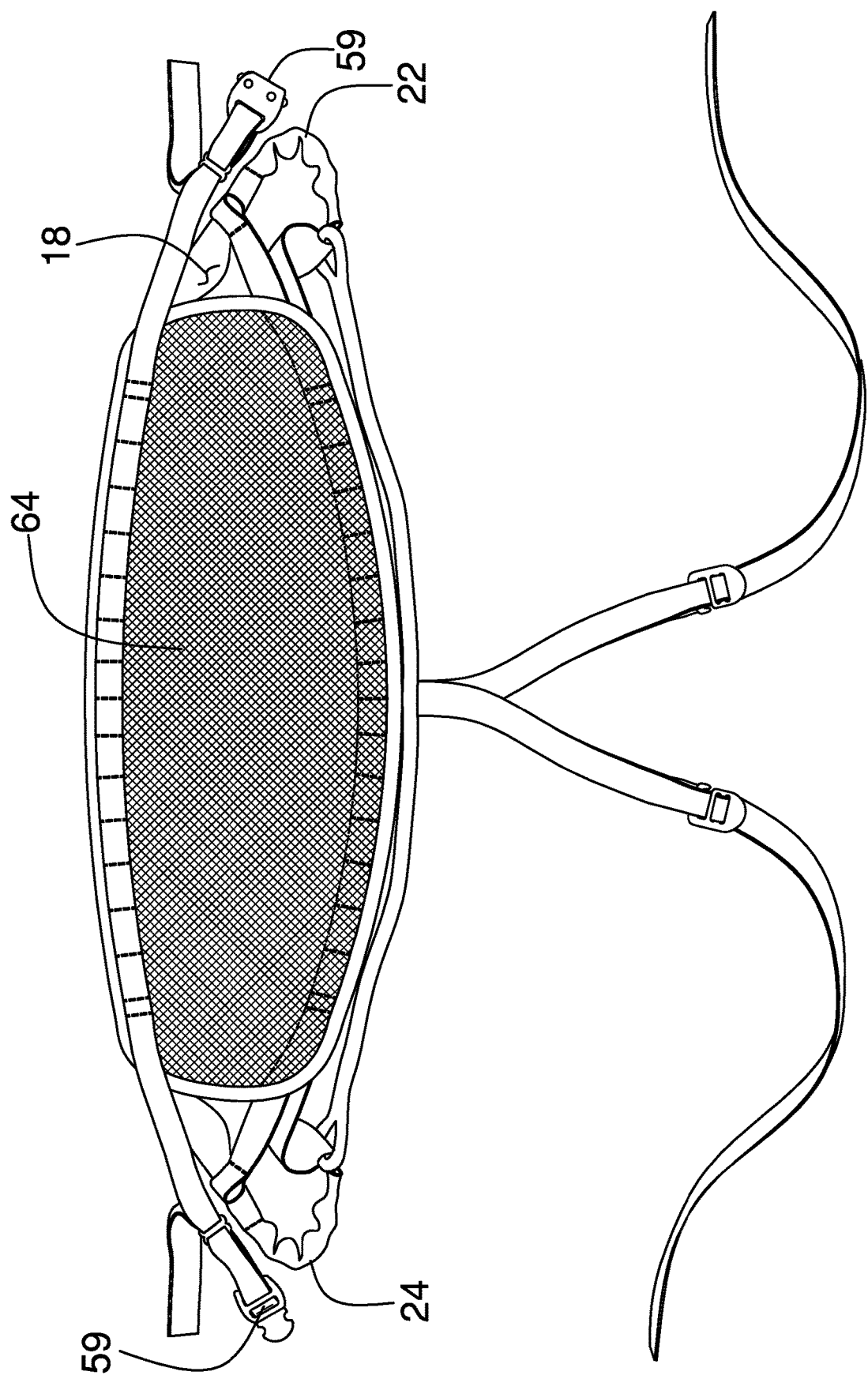
FIG. 2 is a front view of an embodiment of the disclosure.
Figure 3:
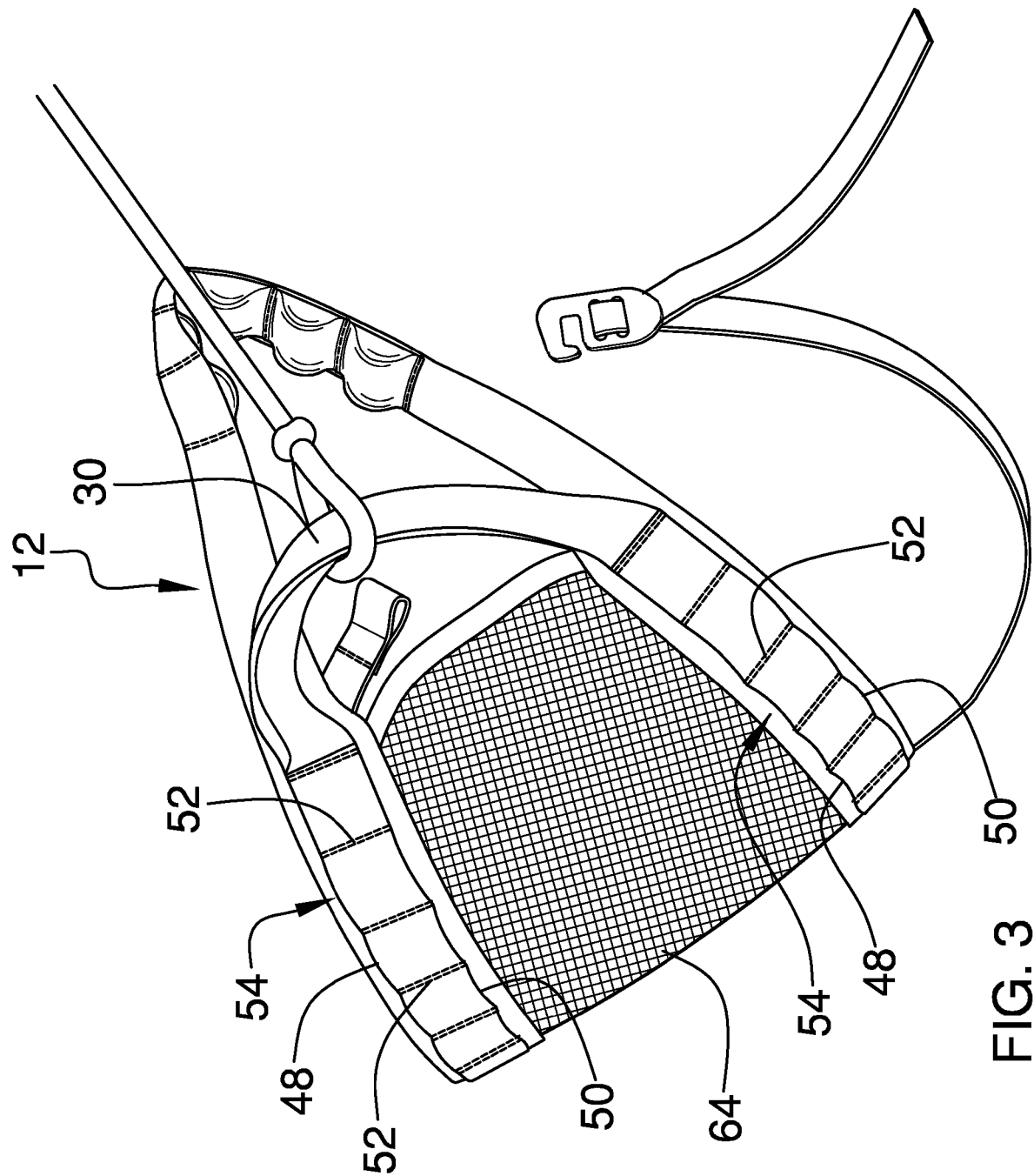
FIG. 3 is a side view of an embodiment of the disclosure.

With reference now to the drawings, and in particular to FIGS. 1 through 6 thereof, a new harness device embodying the principles and concepts of an embodiment of the disclosure and generally designated by the reference numeral 10 will be described.

Figure 4:
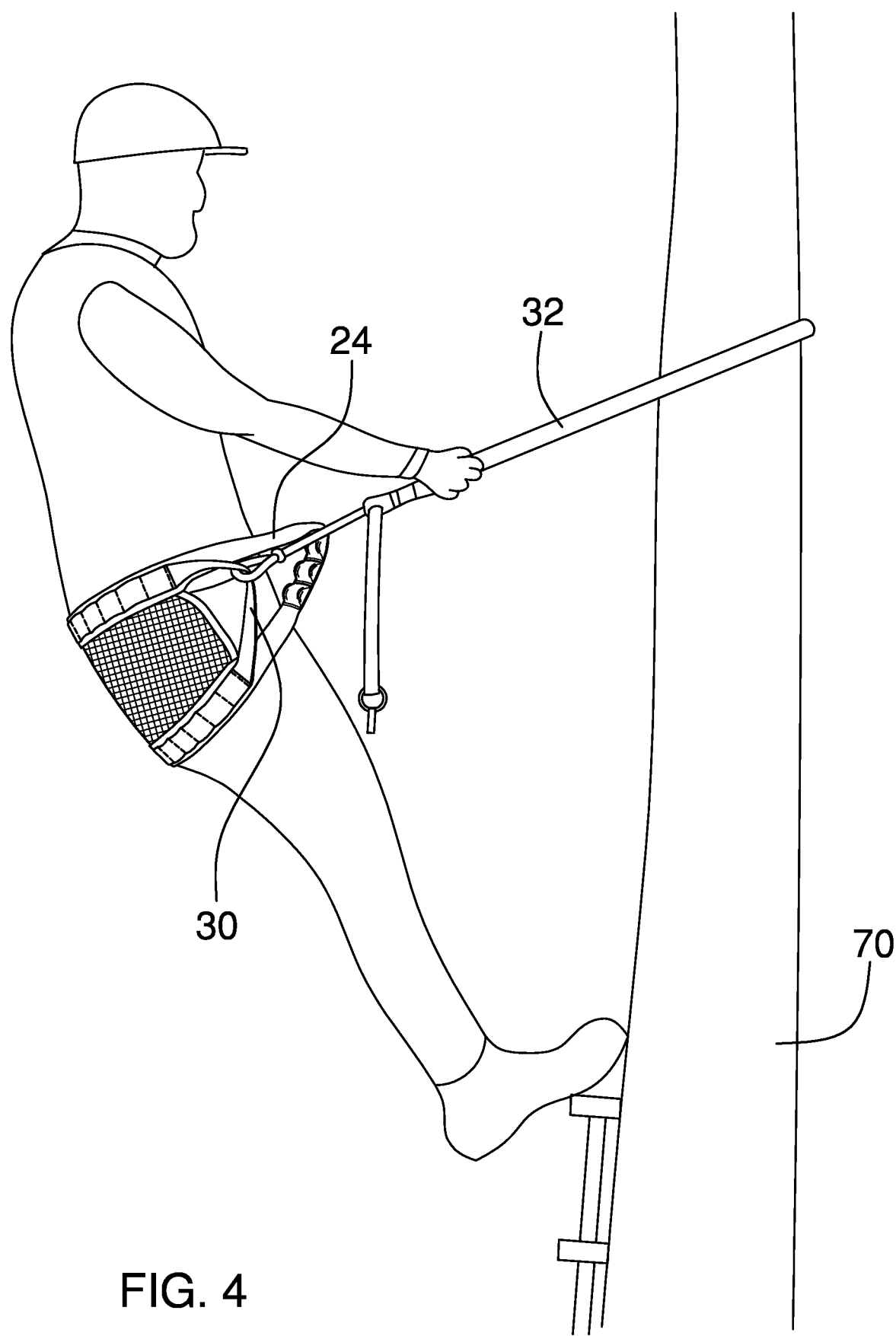
FIG. 4 is a side in-use view of an embodiment of the disclosure.
Figure 5:
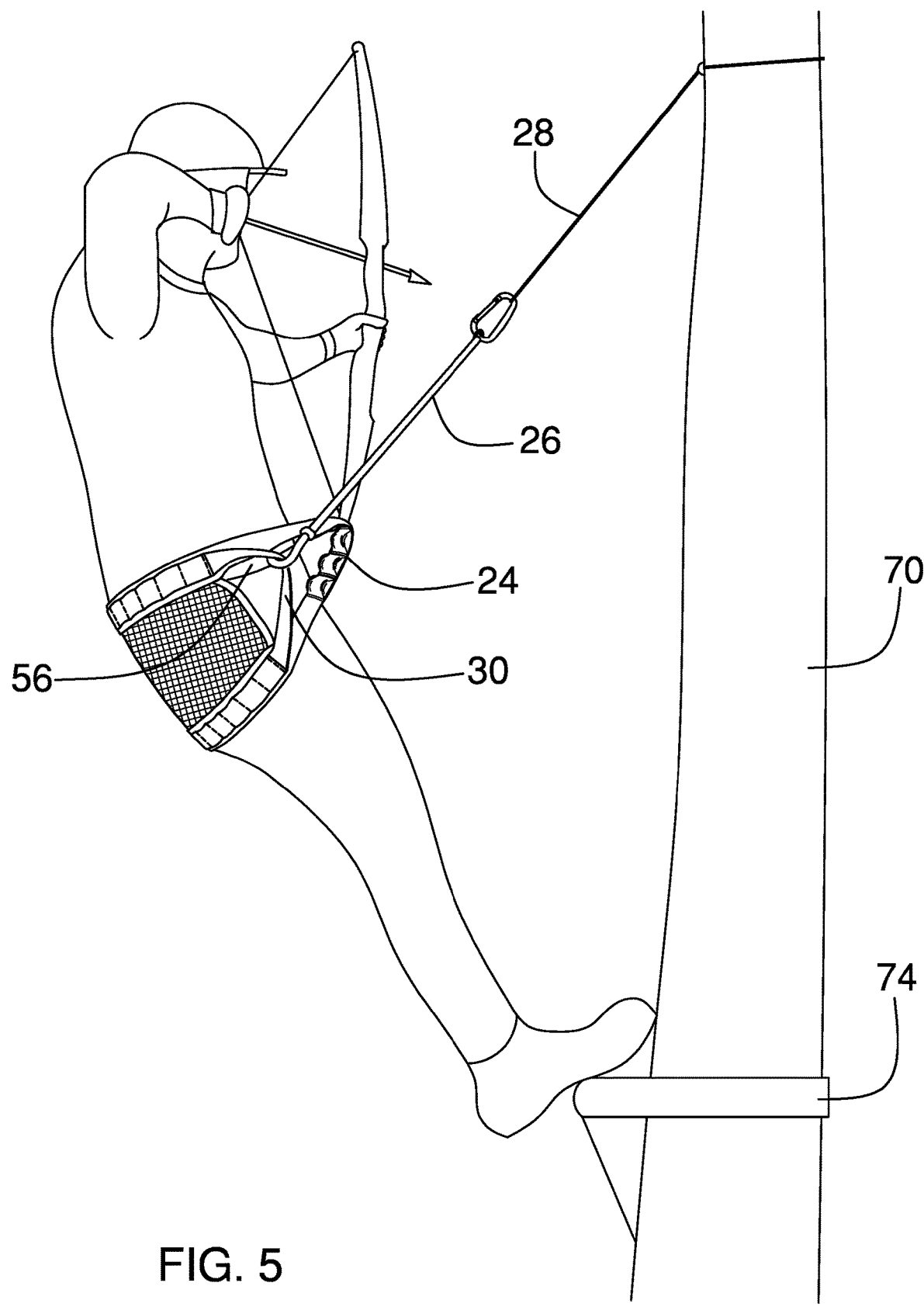
FIG. 5 is a side in-use view of an embodiment of the disclosure.

As best illustrated in FIGS. 1 through 6, the harness with continuous lineman's loop 10 generally comprises a saddle 12 configured to receive the buttocks of a person. The saddle 12 has an upper strap 14 and a lower strap 16 wherein the upper strap 14 is typically placed near the base of the person's back while the lower strap 16 is adjacent to the bottom of the buttocks as is shown in FIG. 4. The saddle 12 has a front side 18, a back side 20, a first lateral edge 22 and a second lateral edge 24. The first 22 and second 24 lateral edges are configured to engage a bridge line 26 such that the bridge line 26 can be secured to a tree 70 with a tree line 28. As can be seen in the figures, the upper 14 and lower 16 straps may be joined to form an oval-shaped, closed loop.

A pair of lineman's loops 30 is attached to the saddle 12 and the lineman's loops 30 are configured to engage a lineman's rope 32. A lineman's loop 30 and lineman's rope 32 is used during the ascending and descending of the tree 70. The lineman's rope 32 is extended around the tree 70 and secured to the lineman's loops 30 so that the lineman's rope 32 will frictionally engage the tree 70. Thus, the climber can lean away from the tree 70 as they climb with the lineman's rope 32 providing an anchor between the climber and the tree 70. This allows for safe climbing and body positioning while climbing. Once the saddle 12 is secured to the tree line 28 via the bridge line 26 so that the saddle 12 is supporting the climber's weight with the tree line 28, the lineman's rope 32 is removed from the lineman's loops 30.

Each of the lineman's loops 30 is positioned adjacent to one of the first 22 and second 24 lateral edges. The lineman's loops 30 are comprised of a continuous loop 34 of webbing. That is, a continuous loop 34 is attached to the saddle 12 such that the edges of the continuous loop 34 extend outwardly, and freely, in lateral directions from the saddle 12 to form the lineman's loops 30. The continuous loop 34 includes an upper portion 36 attached to and extending along the upper strap 14 and a lower portion 38 that is attached to and extends along the lower strap 16. Typically the continuous loop 34 will be attached to the back side 20 of the saddle 12. The lineman's loops 30 are formed of lateral portions of the continuous loop 34 extending between the upper 36 and lower 38 portions.

Figure 6:
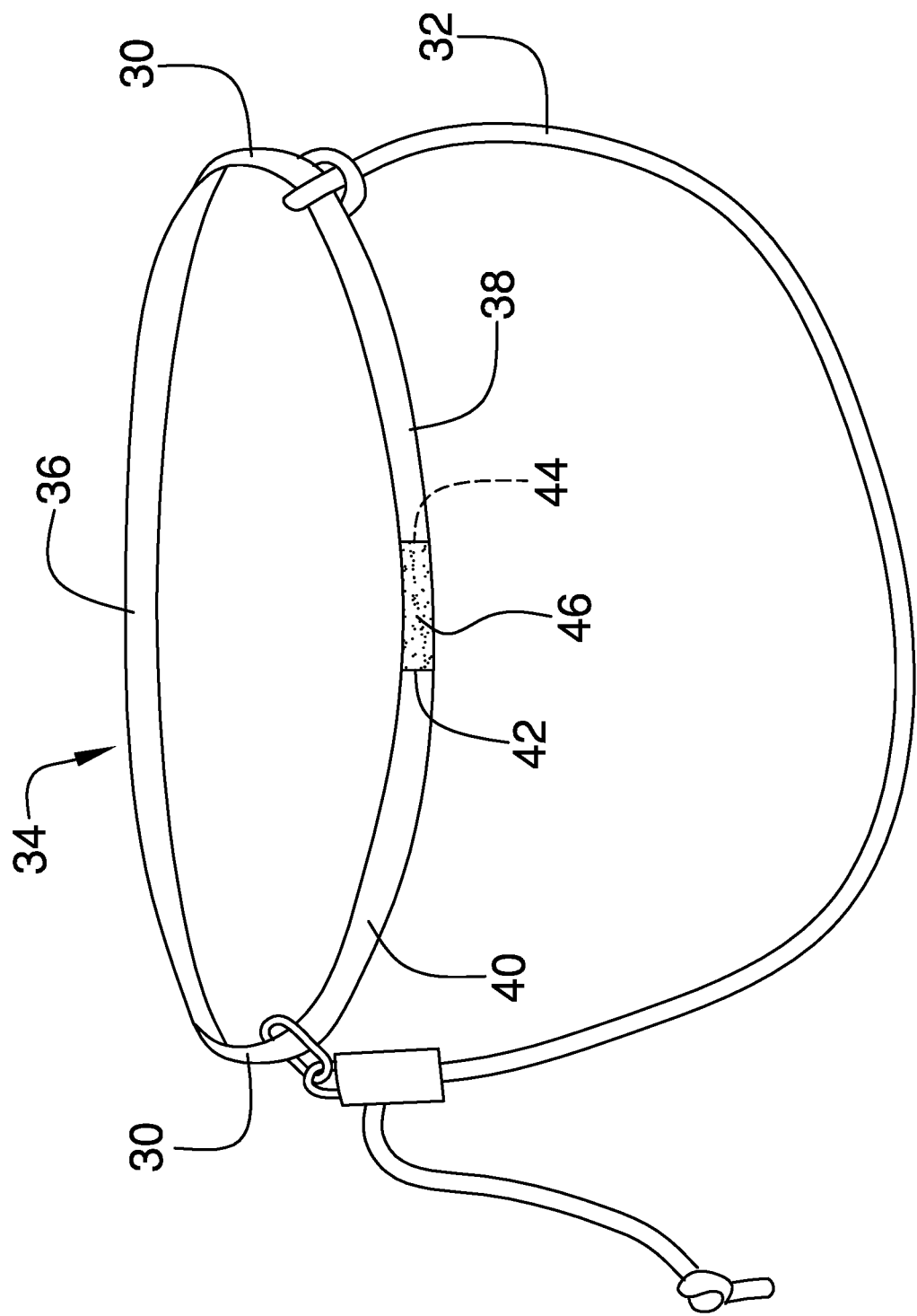
FIG. 6 is a front view of an embodiment of the disclosure.

As shown in FIG. 6, to form the continuous loop 34, a single strap 40 of webbing having a first end 42 and a second end 44 may be overlapped onto itself and the overlapping portions secured together by stitching 46, vibrational friction, heat or other common methods of joining synthetic materials together. Zigzag and bar tacked stitching in particular may be utilized to prevent the overlapping portions from disengaging from each other. The overlapping portions may form an overlapped area having a length of between 2.0 inches and 5.0 inches. The overlapping portions may be located anywhere along the continuous loop 34, however, they will typically be positioned on either the upper 36 or lower 38 straps as opposed to being located on one of the lineman's loops 30. One advantageous area for the overlapping may occur in a central area of the lower strap 16 for reasons stated below. The continuous loop 34 may be comprised of any conventional material used for straps consisting of webbing. Plastic materials such as nylon, polyester, and polypropylene are common, however, high molecular weight polyethylene may be utilized for its high strength and abrasion resistant characteristics.

The upper 36 and lower 38 strap sections each have an upper edge 48 and a lower edge 50. A plurality vertical attachment points 52 attaches the continuous loop 34 to the saddle 12 and extends from each lower edge 48 to a corresponding upper edge 50. The vertical attachment points 52 are spaced from each other such that receivers 54 are formed between the attachment points 52, wherein the receivers 54 extend between the continuous loop 34 and the saddle 12 and form MOLLE (modular lightweight load-carrying equipment) connection points. The vertical attachment points 52 most typically comprise lines of stitching.

A belt strap 56 is attached to the saddle 12 adjacent to the upper strap 14. The belt strap 56 includes a first free portion 57 extending away from the first lateral edge 22 and a second free portion 58 extending away from the second lateral edge 24. A coupler 59 releasably couples together the first and second free portions to form a waist belt configured to extend around a waist of the person.

A pair of leg straps 60 each has an attached end 61 attached to the saddle 12 and a free end 62 extending downwardly away from the saddle 12. The attached ends 61 are typically located on the lower strap 16 in a central area thereof such that the attached ends 61 are attached to the overlapping portions of the continuous loop 34. Each of the leg straps 60 is configured to be extended around a different one of a pair of legs of the person. The leg straps 60 each including a securing member 63 to releasably secure the leg straps 60 in a closed loop around a user's leg.

The saddle 12 may further include a panel 64 comprising a flexible material that is attached to the upper and lower straps and extends from the first lateral strap to the second lateral strap. The panel 64 may be comprised of a mesh material that is substantially flat when lying on a flat surface or may be contoured into a concave structure for receiving the buttocks. The mesh material may comprise a resiliently elastic material for comfort though inelastic materials may also be utilized. Other flexible materials such as fabrics, natural or synthetic, may replace the mesh material, though mesh material at times will be preferred for heat transferring purposes.

In use, the saddle 12 is used in a conventional manner that a harness, used when hunting from trees, is utilized. However, unlike traditional harness assemblies, the lineman's loops 30 are created with a continuous loop 34 providing advantages over prior art systems. Three primary advantages are the strength, safety, and comfort attributes of a continuous loop 34. Because the lineman's loops 30 are formed of one, continuous loop 34, the weight applied to the lineman's loops 30 is distributed across the entire continuous loop 34 and is partially transferred to the saddle 12 to which it is attached. Thus, the strength of the lineman's loops 30 is enhanced. Also, because the weight is distributed across the entire continuous loop 34 and therefore also along the upper 14 and lower 16 straps, comfort is increased for the wearer of the saddle 12 when the lineman's loops 30 are being utilized. In the event of a fall, the force of impact between the person and saddle 12 is distributed over a larger area to reduce the chance of injury, and thus increase the safety, to the wearer of the saddle 12.

The lineman's loops 30 are engaged with the lineman's rope 32 to extend around the tree 70 while the user is ascending or descending the tree 70. The user may utilize a small, modular ladder 72, for instance, for climbing while the lineman's rope 32 prevents the user from falling from the tree 70 since the lineman's rope 32 frictionally engages the tree 70. When the user is at a desired height, they attach a platform 74 to the tree 70, step onto the platform 74, secure the saddle 12 to a tree line 28 with their bridge line 26, and remove the lineman's rope 32 from the lineman's loops 30. The actions above are reversed when it is time to descend from the tree 70.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

We claim:

1. A harness assembly for supporting a person in a tree, the assembly comprising:
    a saddle configured to receive the buttocks of the person, the saddle having an upper strap and a lower strap, the saddle having a front side, a back side, a first lateral edge and a second lateral edge, the first and second lateral edges forming bridge loops on opposite sides of the saddle, the bridge loops being configured to engage a bridge line such that the bridge line can be secured to a tree;
    a pair of lineman's loops being attached to the saddle and being configured to engage a lineman's rope, each of the lineman's loops being positioned adjacent to one of the first and second lateral edges, the lineman's loops being integrally coupled together wherein the lineman's loops are comprised of a continuous loop of webbing, the continuous loop including an upper portion being attached to the upper strap and a lower portion being attached to the lower strap, the lineman's loops being formed of lateral portions of the continuous loop extending between the upper and lower portions; and
    a panel comprising a flexible material being attached to the upper and lower straps and extending from ends of the upper strap to ends of the lower strap wherein the bridge loops extend from opposite ends of the panel.

2. The harness assembly according to claim 1, wherein the upper and lower straps each have an upper edge and a lower edge, a plurality vertical attachment points attaching the continuous loop to the saddle and extending from each lower edge to a corresponding upper edge, the vertical attachment points being spaced from each other such that receivers are formed between the attachment points, the receivers extending between the continuous loop and the saddle.

3. The harness assembly according to claim 1, further including a belt strap being attached to the saddle adjacent to the upper strap, the belt strap including a first free portion extending away from the first lateral edge and a second free portion extending away from the second lateral edge, a coupler releasably coupling together the first and second free portions to form a waist belt configured to extend around a waist of the person.

4. The harness assembly according to claim 3, further including a pair of leg straps each having an attached end being attached to the saddle and a free end extending downwardly away from the saddle, each of the leg straps being configured to be extended around a different one of a pair of legs of the person, each of the leg straps including a securing member to releasably secure the leg straps in a closed loop.

5. The harness assembly according to claim 1, further including a pair of leg straps each having an attached end being attached to the saddle and a free end extending downwardly away from the saddle, each of the leg straps being configured to be extended around a different one of a pair of legs of the person, each of the leg straps including a securing member to releasably secure the leg straps in a closed loop.

6. A harness assembly for supporting a person in a tree, the assembly comprising:
    a saddle configured to receive the buttocks of the person, the saddle having an upper strap and a lower strap, the saddle having a front side, a back side, a first lateral edge and a second lateral edge, the first and second lateral edges forming bridge loops on opposite sides of the saddle, the bridge loops being configured to engage a bridge line such that the bridge line can be secured to a tree;
    a pair of lineman's loops being attached to the saddle and being configured to engage a lineman's rope, each of the lineman's loops being positioned adjacent to one of the first and second lateral edges, the lineman's loops being integrally coupled together wherein the lineman's loops are comprised of a continuous loop of webbing, the continuous loop including an upper portion being attached to the upper strap and a lower portion being attached to the lower strap, the lineman's loops being formed of lateral portions of the continuous loop extending between the upper and lower portions;
    the upper and lower straps each having an upper edge and a lower edge, a plurality vertical attachment points attaching the continuous loop to the saddle and extending from each lower edge to a corresponding upper edge, the vertical attachment points being spaced from each other such that receivers are formed between the attachment points, the receivers extending between the continuous loop and the saddle;
    a belt strap being attached to the saddle adjacent to the upper strap, the belt strap including a first free portion extending away from the first lateral edge and a second free portion extending away from the second lateral edge, a coupler releasably coupling together the first and second free portions to form a waist belt configured to extend around a waist of the person;
    a pair of leg straps each having an attached end being attached to the saddle and a free end extending downwardly away from the saddle, each of the leg straps being configured to be extended around a different one of a pair of legs of the person, each of the leg straps including a securing member to releasably secure the leg straps in a closed loop; and
    the saddle including a panel comprising a flexible material being attached to the upper and lower straps and extending from ends of the upper strap to ends of the lower strap wherein the bridge loops extend from opposite ends of the panel.

\* \* \* \* \*